(12) United States Patent
Watson et al.

(10) Patent No.: US 8,745,165 B2
(45) Date of Patent: Jun. 3, 2014

(54) SYSTEM AND METHOD FOR MANAGING DISTRIBUTION OF RICH MEDIA CONTENT

(75) Inventors: Scott Watson, Marina Del Rey, CA (US); Armando Santana, Glendale, CA (US); Orrin J. Shively, Glendale, CA (US); Robert Swirsky, Sunnyvale, CA (US); Jonathan Gilbert, San Francisco, CA (US); Ben Brown, Austin, TX (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 12/313,229

(22) Filed: Nov. 17, 2008

(65) Prior Publication Data

US 2009/0234935 A1    Sep. 17, 2009

Related U.S. Application Data

(60) Provisional application No. 61/069,116, filed on Mar. 11, 2008.

(51) Int. Cl.
*G06F 15/16*    (2006.01)

(52) U.S. Cl.
USPC .......................................... 709/219; 709/203

(58) Field of Classification Search
USPC ................................................ 709/219, 203
See application file for complete search history.

(56) References Cited

U.S. PATENT DOCUMENTS

| | | | |
|---|---|---|---|
| 6,189,783 B1 | 2/2001 | Motomiya | |
| 6,671,807 B1 * | 12/2003 | Jaisimha et al. | 713/193 |
| 7,251,495 B2 | 7/2007 | Keyani | |
| 7,409,221 B2 | 8/2008 | Obradovich | |
| 7,412,042 B2 | 8/2008 | Henry | |
| 7,505,779 B1 | 3/2009 | David | |
| 7,509,124 B2 | 3/2009 | O'Neil | |
| 7,627,608 B2 * | 12/2009 | Strandell et al. | 1/1 |
| 7,689,510 B2 * | 3/2010 | Lamkin et al. | 705/51 |
| 7,733,213 B2 * | 6/2010 | Levine | 340/5.28 |
| 7,779,097 B2 * | 8/2010 | Lamkin et al. | 709/223 |
| 7,801,537 B2 | 9/2010 | Matsumoto | |
| 8,005,460 B2 | 8/2011 | Chen | |
| 8,099,109 B2 | 1/2012 | Altman | |
| 8,332,402 B2 | 12/2012 | Forstall | |
| 2001/0054101 A1 | 12/2001 | Wilson | |
| 2002/0068573 A1 | 6/2002 | Raverdy | |
| 2002/0069419 A1 * | 6/2002 | Raverdy et al. | 725/87 |

(Continued)

OTHER PUBLICATIONS

"Twitter: What are you doing?" 2008 *Twitter.* Jan. 6, 2009 <http://twitter.com/>.

(Continued)

*Primary Examiner* — Waseem Ashraf
(74) *Attorney, Agent, or Firm* — Farjami & Farjami LLP (57) ABSTRACT

There is provided a system for managing distribution of rich media content. The system comprises a communications server accessible by a mobile device; a local services network interactively connected to the communications server; a rich media control application resident on the communications server, the rich media control application configured to manage rich media distribution for a user of the mobile device in response to receipt of a valid rich media access code from the mobile device, by requesting a rich media content corresponding to the rich media access code from the local services network; receiving the rich media content from the local services network; and sending a notification message to the mobile device for enabling the user of the mobile device to access the rich media content.

18 Claims, 5 Drawing Sheets

(56) References Cited

U.S. PATENT DOCUMENTS

| | | |
|---|---|---|
| 2002/0082897 A1 | 6/2002 | Menelly |
| 2002/0174003 A1 | 11/2002 | Redmann |
| 2002/0174248 A1 | 11/2002 | Morriss |
| 2003/0014749 A1 | 1/2003 | Simons |
| 2003/0083889 A1 | 5/2003 | Macklin |
| 2003/0154382 A1* | 8/2003 | Vicard ............... 713/186 |
| 2003/0172090 A1 | 9/2003 | Asunmaa |
| 2003/0185232 A1 | 10/2003 | Moore |
| 2003/0191946 A1* | 10/2003 | Auer et al. ........... 713/182 |
| 2004/0019513 A1 | 1/2004 | Colalancia |
| 2004/0019800 A1 | 1/2004 | Tatebayashi |
| 2004/0022227 A1 | 2/2004 | Lynch |
| 2004/0078341 A1 | 4/2004 | Steichen |
| 2004/0116115 A1 | 6/2004 | Ertel |
| 2004/0158482 A1 | 8/2004 | Hale |
| 2004/0172315 A1 | 9/2004 | Hale |
| 2004/0172316 A1 | 9/2004 | Hale |
| 2004/0181424 A1 | 9/2004 | Hale |
| 2004/0181602 A1* | 9/2004 | Fink ................... 709/229 |
| 2004/0184593 A1 | 9/2004 | Elsey |
| 2004/0214600 A1 | 10/2004 | Schechet |
| 2004/0266408 A1 | 12/2004 | Maes |
| 2005/0044224 A1* | 2/2005 | Jun et al. ............. 709/225 |
| 2005/0060173 A1 | 3/2005 | Hale |
| 2005/0144642 A1 | 6/2005 | Ratterman |
| 2005/0202830 A1 | 9/2005 | Sudit |
| 2005/0240970 A1 | 10/2005 | Schwalb |
| 2005/0262530 A1* | 11/2005 | Ruetschi et al. ........ 725/35 |
| 2005/0266827 A1 | 12/2005 | Kim |
| 2006/0008256 A1* | 1/2006 | Khedouri et al. ....... 386/124 |
| 2006/0031489 A1* | 2/2006 | Marcjan .............. 709/225 |
| 2006/0046700 A1* | 3/2006 | Anderson ........... 455/414.1 |
| 2006/0046755 A1* | 3/2006 | Kies ................... 455/518 |
| 2006/0159109 A1* | 7/2006 | Lamkin et al. ......... 370/401 |
| 2006/0161479 A1* | 7/2006 | Nashed ................ 705/14 |
| 2006/0189337 A1 | 8/2006 | Farrill |
| 2006/0230061 A1 | 10/2006 | Sample |
| 2007/0016584 A1* | 1/2007 | Grell .................... 707/9 |
| 2007/0016674 A1* | 1/2007 | Shinohara et al. ...... 709/224 |
| 2007/0032247 A1 | 2/2007 | Shaffer |
| 2007/0038476 A1 | 2/2007 | Sternlicht |
| 2007/0136573 A1 | 6/2007 | Steinberg |
| 2007/0155307 A1* | 7/2007 | Ng et al. .............. 455/3.01 |
| 2007/0157281 A1* | 7/2007 | Ellis et al. ............ 725/134 |
| 2007/0161402 A1* | 7/2007 | Ng. et al. ............ 455/554.2 |
| 2007/0203763 A1 | 8/2007 | Ackley |
| 2007/0208664 A1* | 9/2007 | Ortega ................. 705/51 |
| 2007/0260636 A1* | 11/2007 | Baio et al. ........... 707/104.1 |
| 2007/0288486 A1* | 12/2007 | Sugihara ............... 707/10 |
| 2008/0013537 A1* | 1/2008 | Dewey et al. .......... 370/390 |
| 2008/0014911 A1 | 1/2008 | Medved |
| 2008/0045192 A1 | 2/2008 | Zhao |
| 2008/0189293 A1* | 8/2008 | Strandel et al. ......... 707/10 |
| 2008/0201158 A1 | 8/2008 | Johnson |
| 2008/0248781 A1 | 10/2008 | Cedo |
| 2008/0319935 A1 | 12/2008 | Chandak |
| 2009/0061835 A1* | 3/2009 | Schmidt et al. ....... 455/414.2 |
| 2009/0100480 A1* | 4/2009 | McQuaide, Jr. ........ 725/100 |
| 2009/0156181 A1* | 6/2009 | Athsani et al. ....... 455/414.2 |
| 2009/0163177 A1 | 6/2009 | Bearden |
| 2009/0204905 A1* | 8/2009 | Toghia ................ 715/753 |
| 2009/0215469 A1 | 8/2009 | Fisher |
| 2009/0233543 A1* | 9/2009 | Watson et al. ......... 455/3.06 |
| 2009/0233639 A1 | 9/2009 | Watson |
| 2009/0234935 A1 | 9/2009 | Watson |
| 2009/0313479 A1* | 12/2009 | Schroter .............. 713/185 |
| 2010/0063866 A1 | 3/2010 | Kinoshita |
| 2010/0080163 A1 | 4/2010 | Krishnamoorthi |
| 2010/0093373 A1 | 4/2010 | Olsson |
| 2010/0144328 A1 | 6/2010 | Keating |
| 2010/0150120 A1 | 6/2010 | Schlicht |
| 2011/0082639 A1 | 4/2011 | Jung |

OTHER PUBLICATIONS

"Jaiku | Your Conversation." *2008 Jaika*. Jan. 6, 2009 <http://jailcu.com/>.

Acohido, Byron, *Google's GPhone strategy could keep user costs low*, USATODAY.com., (Oct. 14, 2007).

"3jam SuperTest::Your Free Text Messaging Inbox on the Web." *2009 3jam, Inc.*. Jan. 6, 2009 <http://www.3jam.com/>.

"Your Social Compass." *2009 Loopt, Inc*. Jan. 6, 2009 <http://www.loopt.com/>.

"dodgeball.com :: mobile social software." *2009 Google Inc*. Jan. 6, 2009. <http://www.dodgeball.com>.

"Disney Files Patent for Wireless FastPasses." NETCOT.com. posted Sep. 5, 2007 <http://www.netcot.com/thesite/2007/09/05/disney-files-patent-for-wireless-fastpasses>.

U.S. Appl. No. 12/313,228 Non-Final OA dated Mar. 28, 2011.

U.S. Appl. No. 12/313,228 Resp. to Non-Final OA (As Filed on May 25, 2011).

U.S. Appl. No. 12/313,231 Non-Final OA dated Apr. 1, 2011.

U.S. Appl. No. 12/313,231 Resp. to Non-Final OA (As Filed Jul. 1, 2011).

U.S. Appl. No. 12/313,227 Non-Final OA dated Mar. 31, 2011.

U.S. Appl. No. 12/313,227 Resp. to Non-Final OA (As Filed Jun. 30, 2011).

U.S. Appl. No. 12/313,231 Non-Final OA dated May 24, 2012.

* cited by examiner

SYSTEM AND METHOD FOR MANAGING DISTRIBUTION OF RICH MEDIA CONTENT

RELATED APPLICATIONS

This application claims priority to U.S. Provisional Application No. 61/069,116, filed on Mar. 11, 2008, which is hereby incorporated by reference in its entirety.

BACKGROUND OF THE INVENTION

1. Field of the Invention

The present invention relates generally to network communications. More particularly, the present invention relates to network mediated distribution of rich media content.

2. Background Art

People respond more powerfully to visual imagery than most other communication formats. Perhaps because human survival has long depended on our ability to utilize visual images to recognize and distinguish predator from prey, and friend from foe, visual images are singularly effective in focusing our attention and engaging our minds. Similarly, the primitive need to rapidly identify objects in our visual field and have those objects trigger the appropriate psychological response may be responsible for the emotionally evocative power of visual images. Whatever its origin, the human response to visual images is deeply embedded and undeniable, and imbues those images with the ability to fill us with terror, disgust us, spark our appetites, or delight us.

The pleasure derivable from viewing visual imagery is readily apparent modern media consumption patterns. For example, the almost immediate and enduring popularity of film and television as communication media are testimony to their unique effectiveness in conveying information or entertainment in an aesthetically pleasing and cognitively satisfying format. More recently, television programs such as "America's Funniest Home Videos," and websites such as YouTube, demonstrate the enjoyment available from sharing visual imagery in a group setting. From an individual perspective, the fun of sharing visual images with friends is evident from the enormous popularity of mobile telephones equipped with digital cameras, many of which are capable of recording short video segments in addition to taking still digital photos.

Because of their power to be emotionally evocative as well as to inform, visual images and other forms of rich media content are ideal for sharing the excitement of a pleasurable or otherwise stimulating experience. This may be a particular source of enjoyment for members of a group participating in a common social outing to a recreational venue, but unable to personally experience every attraction available at the venue. For example, a group of friends on a joint outing to a theme park may choose to split up to explore a large park property, or they may simply have different tastes in their choice of attractions to enjoy. Nevertheless, through shared rich media content such as photos or videos, the group members either absent from a particular attraction, or choosing not to participate for some reason, may still enjoy some of the excitement experienced by those actually interacting with the attraction. For instance, one friend too timid to ride a rollercoaster, may nevertheless enjoy some of the thrill felt by another friend on the ride, as a result of viewing pictures or video recorded during the event.

One conventional approach to sharing experiences at a recreational venue such as a theme park is to have one or more professional photographers or videographers employed by the theme park produce rich media content including images of the guests and make those photos or videos available for purchase by the guest and other members of their group. Using the example of a rollercoaster attraction once again, a theme park photographer might be stationed at a particularly dramatic point on the track to take photos of the riders as they pass. An individual rider and other members of the rider's group could later view that photo and decide whether to purchase it. A similar approach could be used for other selected theme park attractions, so that group members could vicariously experience and enjoy activities in which they were not direct participants. One significant disadvantage of this conventional approach, however, is that the context for the visual images is predetermined by the venue, so that individual guests have little creative control over production of the rich media content. In addition, under this approach, images are typically viewed collectively at the end of the outing, robbing the vicarious experience of much of its immediacy.

Another conventional approach to sharing experiences such as the rollercoaster attraction through shared rich media content, is for one member of the group to produce and distribute the content themselves. The friend riding the rollercoaster might take photos or record video from the rollercoaster rider's perspective during particularly exciting parts of the ride, for example. That friend could then either share those images with other friends in person, or perhaps transmit the photos over a mobile communication network to others having personal communication devices suitably configured to receive the images. Although perhaps providing the element of creative control absent from the previous approach, this conventional solution has significant drawbacks as well.

In order to share the visual images in person, for example, the group members must actually be in the presence of the friend having produced the rich media content, once again diminishing the immediacy of the experience. The alternative distribution technique, in which rich media content such as photos are sent over a mobile communication network, while overcoming the immediacy problem, incurs costs for both the sender and the recipients of the visual images, arising from user charges imposed by their respective mobile communication carriers. Where many images are generated and distributed in this manner during the course of a group outing, those charges may accumulate to a substantial sum. When these costs are anticipated by the group, they may limit the enjoyment available though photo sharing by discouraging its use. When unanticipated or unaffordable, they may retrospectively ruin the memory of an otherwise pleasurable outing for individual members of the group.

As a result of the various described disadvantages associated with conventional approaches to sharing rich media content produced by group members during a group outing, the enjoyment obtained from the outing may be less than it might have been had sharing rich media content been easier or less costly. Furthermore, the recreational outing may prove to be a less enjoyable activity than it might be were the group members able to more immediately access photos and other rich media content produced by professionals employed by the venue host.

Accordingly, there is a need to overcome the drawbacks and deficiencies in the art by providing a solution for managing distribution of rich media content that provides group members with an efficient and cost effective means of sharing such content.

SUMMARY OF THE INVENTION

There are provided systems and methods for managing distribution of rich media content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for managing distribution of rich media content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 1:
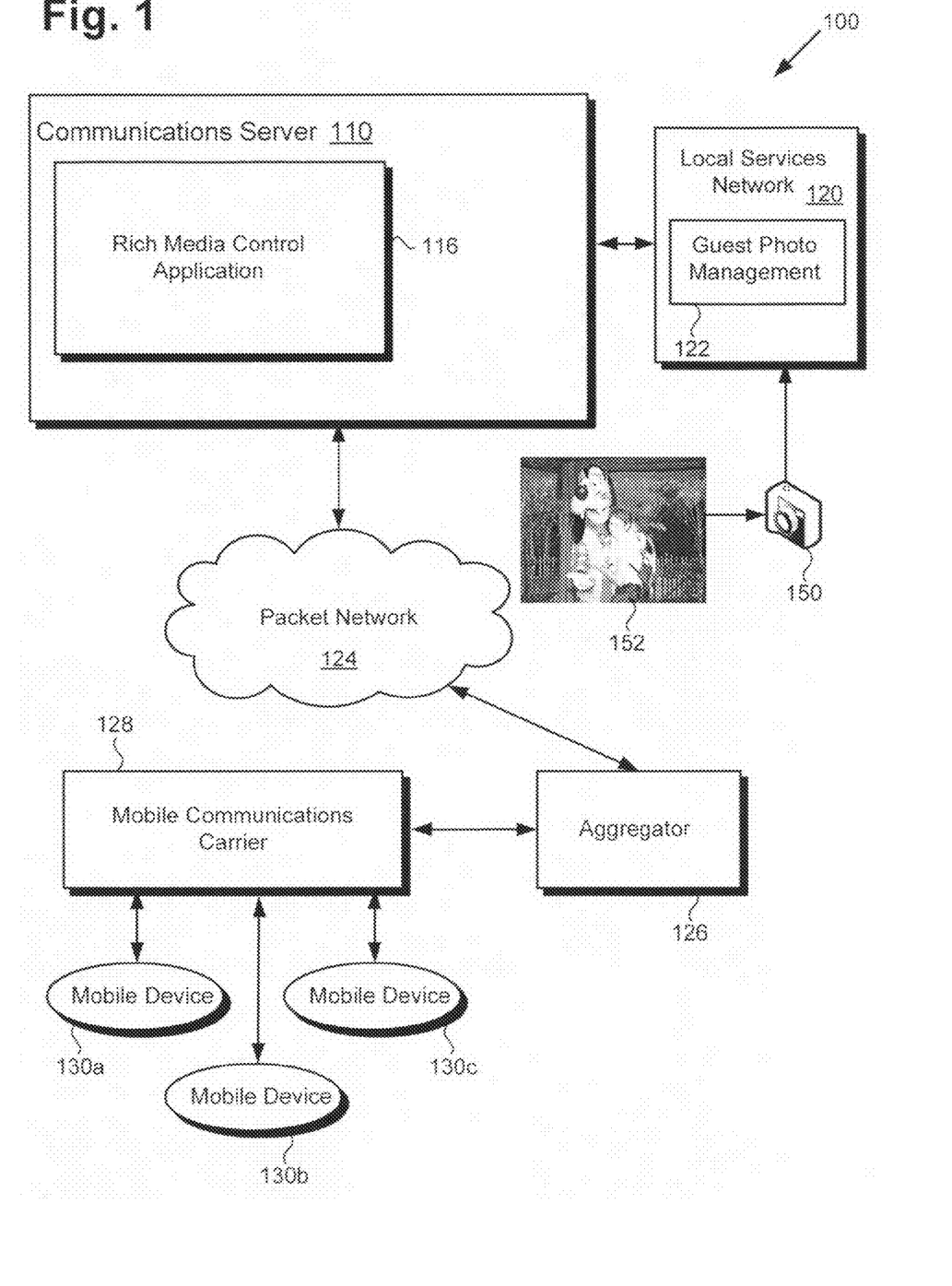
FIG. 1 is a block diagram of a system for managing distribution of rich media content, according to one embodiment of the present invention.

FIG. 1 is a block diagram of communication system 100 for managing distribution of rich media content, according to one embodiment of the present invention. Communication system 100 includes communications server 110, local services network 120, packet network 124, aggregator 126, mobile communications carrier 128, and mobile devices 130a, 130b, and 130c. Communications server 110 may be used to support communication at a recreational venue such as a theme park or destination resort, for example.

As shown in FIG. 1, communications server 110 is interactively linked to local services network 120, which may perform any of numerous information management functions within the recreational venue. For example, local services network 120 may provide updated information relevant to services and amenities available for enjoyment by visitors to the recreational venue. In addition, local services network 120 supports guest photo management application 122, which may coordinate availability of photos of guests taken by theme park photographers, for example, as further shown by camera 150 and photo 152. Also shown in FIG. 1 is rich media control application 116, residing on communications server 110.

According to the embodiment of FIG. 1, rich media control application 116 on communications server 110 is configured to manage rich media distribution among mobile devices 130a, 130b, 130c, and local services network 120, which includes guest photo management application 122. Mobile devices 130a, 130b, and 130c, respectively, correspond to devices operated by users (not shown in FIG. 1) who are guests visiting the recreational venue as members of a group. For example, a guest using mobile device 130a may identify him or herself to rich media control application 116 by sending a short message service (SMS) text message containing a rich media access code to communications server 110 via mobile communications carrier 128. As shown in FIG. 1, aggregator 126, which may be a short message service center (SMSC) for example, mediates communication between mobile communications carrier 128 and communications server 110.

In a similar manner, guests using mobile devices 130b and 130c may identify themselves as being associated with the rich media access code identifying the user of mobile device 130a. Subsequently, the users of mobile devices 130a, 130b, and 130c, can access and exchange rich media content in a number of different ways, as will be described. For example, the members of the group can utilize rich media control application 116 to obtain rich media content produced by the venue and available via local services network 120. In addition, a user of mobile device 130a can send rich media content to communications server 110, for distribution by rich media control application 116 to mobile devices 130b and 130c.

Rich media control application 116 is configured to manage rich media distribution for one or more of mobile devices 130a, 130b, or 130c, in response to receipt of a valid rich media access code from the respective mobile devices. Rich media control application 116 can then request rich media content corresponding to the rich media access code from local services network 120, receive the rich media content from local services network 120, and send a notification message to the respective mobile devices from which the valid rich media access code was received. The notification message enables the mobile device users to access the rich media content, which may comprise a photo or video, for example. Because the notification message may be sent in any of a variety of messaging formats, in some embodiments the mobile device user may be made aware of rich media content as it becomes available, without having to incur the cost of acquiring the content if it is not desired.

Rich media control application 116 may be further configured to manage distribution of rich media content between the users of mobile devices 130a, 130b, and 130c, for example, by receiving an item of rich media content from any member of that group and sending the other members of the group a group notification message of availability of the item of rich media content. As was true for the notification message provided in response to receipt of rich media content from local services network 120, in some embodiments the group notification message may enable its recipients to access the item of rich media content without imposing the cost of acquiring the content unless it is actively requested.

Although the present embodiment has been described by reference to SMS text messaging, in other embodiments, messaging relating to rich media distribution may occur via other communication formats. For example, in one embodiment, rich media content distribution management messaging, such as opt-in messaging, notification messaging, and group notification messaging, for example, may include exchange of Multimedia Messaging Service (MMS) messages. In other embodiments, rich media content distribution management messaging may occur through mobile Instant Messaging (IM) or other Transmission Control Protocol/Internet Protocol (TCP/IP) channels, enabled by Enhanced Data rates for Global System for Mobile communications (EDGE), Enhanced General Packet Radio Service (EGPRS), or International Mobile Telecommunications Single Carrier (IMT-SC) technologies, for example.

Figure 2:
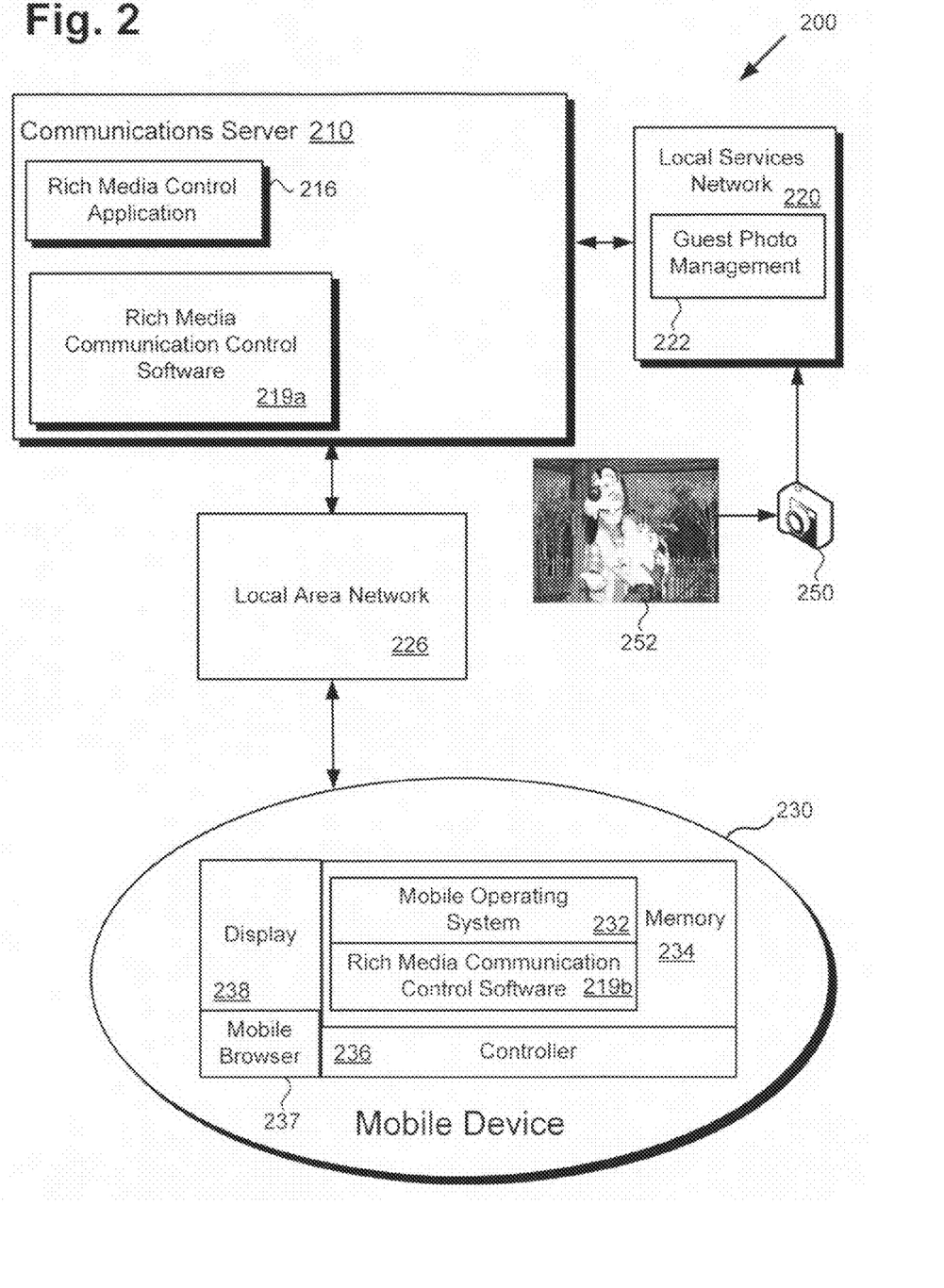
FIG. 2 is a block diagram of a system for managing distribution of rich media content, according to another embodiment of the present invention.

Turning to FIG. 2, FIG. 2 is a block diagram of communication system 200 for managing distribution of rich media content, according to another embodiment of the present invention. Communication system 200 comprises communications server 210, local services network 220 including guest photo management application 222, and mobile device 230, corresponding respectively to communications server 110, local services network 120 including guest photo management application 122, and any of mobile devices 130a, 130b, or 130c, in FIG. 1. In addition, FIG. 2 includes camera 250 and photo 252, corresponding respectively to camera 150 and photo 152 in FIG. 1. Also shown in FIG. 2 is rich media control application 216, corresponding to rich media control application 116, in FIG. 1. Furthermore, in FIG. 2, communications server 210 includes rich media communication control software 219a, having no analogue in FIG. 1.

As shown in FIG. 2, mobile device 230 is in communication with communications server 210 through local area network (LAN) 226, which may be supported by the recreational venue hosting communications server 210, for example. Mobile device 230 includes mobile operating system 232 located in memory 234, controller 236, mobile browser 237, and display 238. Also present in memory 234 of mobile device 230, is rich media communication control software 219b, corresponding to rich media communication control software 219a, on communications server 210. Mobile device 230 may be any device capable of supporting wireless data band communication, such as a suitably configured mobile telephone, personal digital assistant (PDA), digital media player, wireless computer, or wireless gaming console, for example.

According to the present embodiment, rich media communication control software 219b is located in memory 234, having been received from communications server 210 via LAN 226. LAN 226 may comprise a wireless network such as a Wi-Fi, Worldwide Interoperability for Microwave Access (WiMAX), or Bluetooth network, for example. Although in the present embodiment, transfer of rich media communication control software 219a is shown to result from data transfer over LAN 226, in another embodiment rich media communication control software 219a may be downloaded over a packet network, such as the Internet, for example. In yet another embodiment, rich media communication control software 219a may be transferred via a wired or wireless connection to a client computer (not shown in FIG. 2). In that embodiment, the client computer serving as the intermediary transfer mechanism for transfer of rich media communication control software 219a may itself receive rich media communication control software 219a as a download over a packet network, a transfer over LAN 226, or as an upload from a compact disc read-only memory (CD-ROM) or other portable computer-readable storage medium. Once transferred to mobile device 230, rich media communication control software 219b may be stored in memory 234 and run locally on mobile device 230.

Controller 236 may be the central processing unit for mobile device 230, for example, in which role controller 236 runs mobile operating system 232, launches mobile browser 237, and facilitates execution of rich media communication control software 219b. Web browser 237, under the control of controller 236, may be used to enable a user of mobile device 230 to view messages and rich media content distributed by rich media control application 216 running on communications server 210.

As is the case for communication system 100 in FIG. 1, in FIG. 2, communications server 210 is configured to manage exchange of rich media content between mobile device 230 and local services network 220, and among mobile device 230 and other mobile devices used by the members of a group including the user of mobile device 230.

Figure 3A:
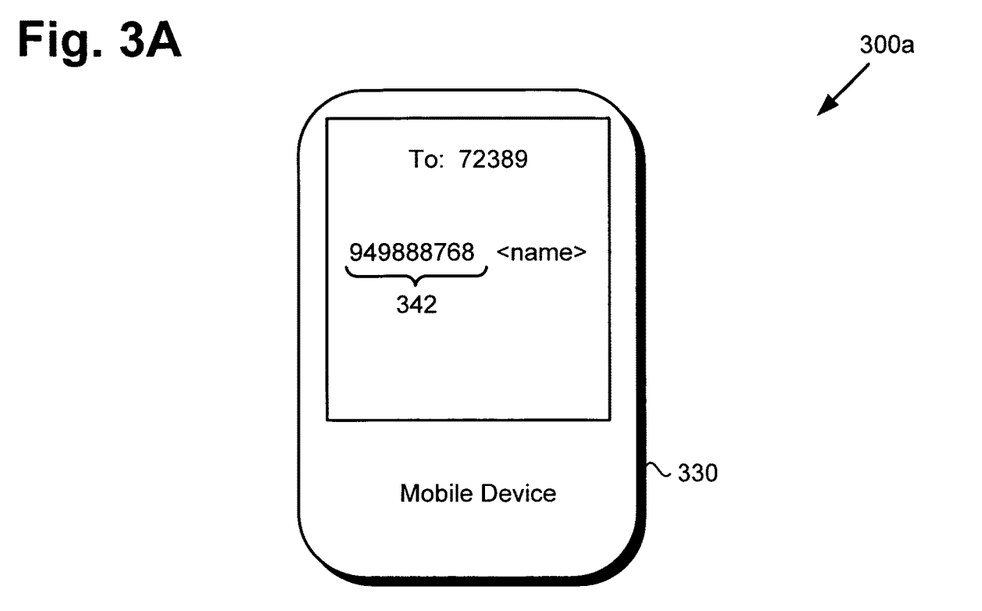
FIG. 3A shows a visual frame of a mobile device display corresponding to entry of a rich media access code, according to one embodiment of the present invention.
Figure 3B:
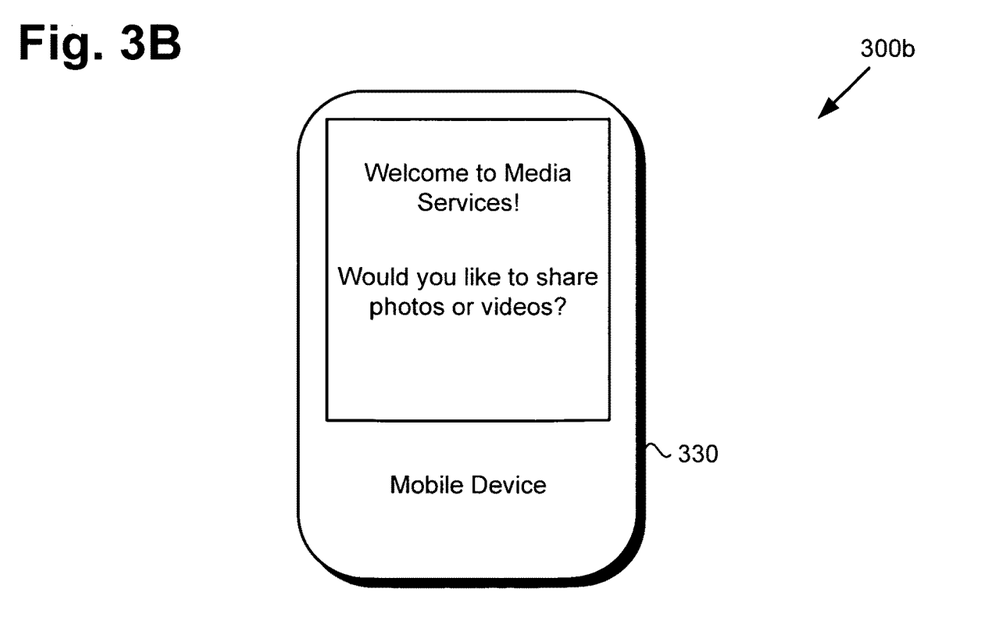
FIG. 3B shows a visual frame of a mobile device display including a confirmation message sent by a communications server running a rich media control application, according to one embodiment of the present invention.

As has been previously mentioned, the communication systems shown in FIGS. 1 and 2 may be utilized to manage distribution of rich media content across a recreational venue corresponding respectively to local services networks 120 and 220, such as a theme park or destination resort, for example. Those aspects of the present invention will now be further described by reference to FIGS. 3A, 3B, and 4, in addition to FIG. 1. FIG. 3A shows visual frame 300a of a mobile device display corresponding to entry of a rich media access code, according to one embodiment of the present invention, while FIG. 3B shows exemplary visual frame 300b of a confirmation message sent by a communications server running a rich media control application. It is noted that mobile device 330 in FIGS. 3A and 3B corresponds to mobile device 130, in FIG. 1. It is further noted that although for clarity of presentation, the following description focuses on the system shown FIG. 1, the system of FIG. 2 is fully capable of managing distribution of rich media content in the manner described.

Figure 4:
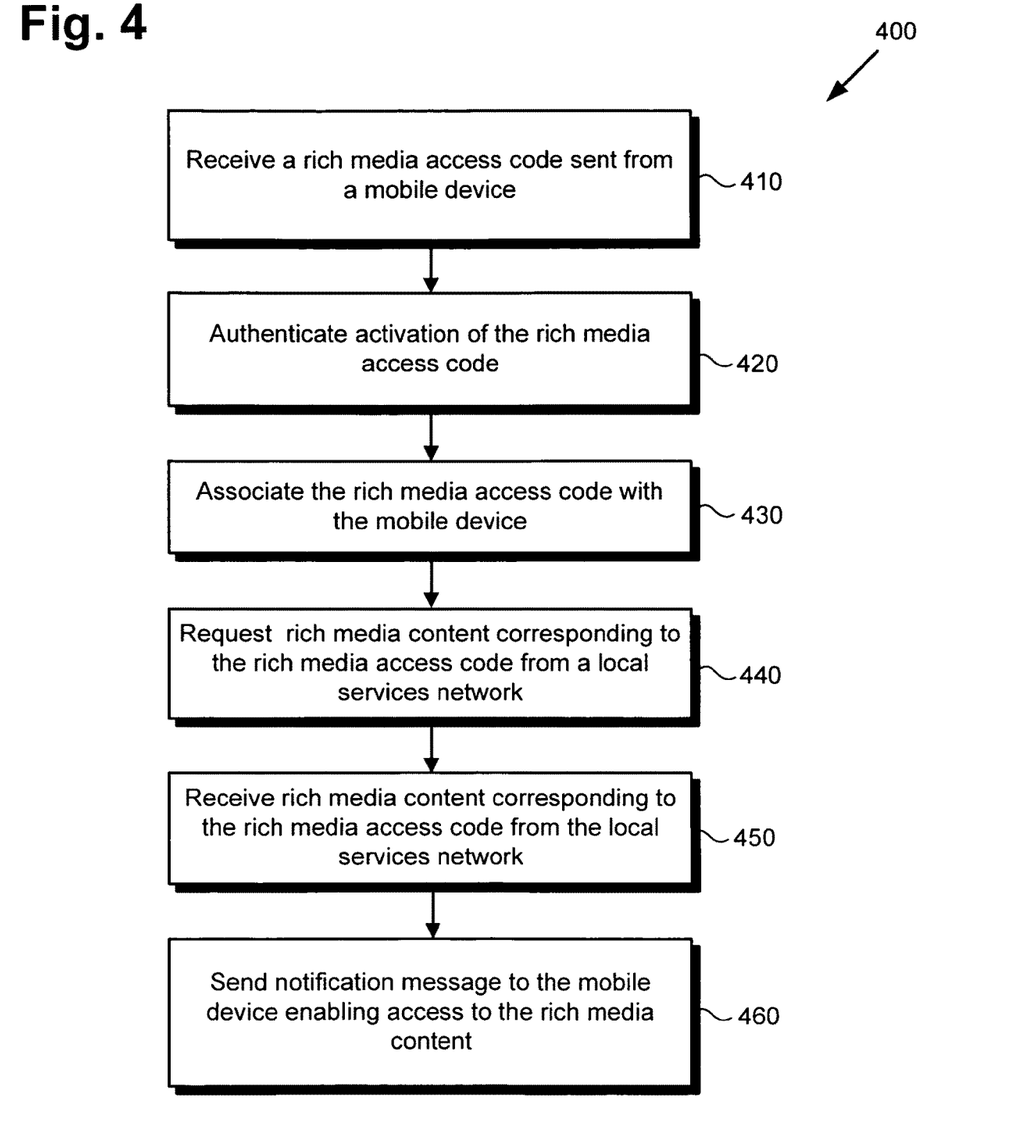
FIG. 4 is a flowchart presenting a method for managing distribution of rich media content, according to one embodiment of the present invention.

Turning to FIG. 4, FIG. 4 shows flowchart 400 describing the steps, according to one embodiment, of a method for managing distribution of rich media content. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present method, other embodiments may utilize steps different from those shown in flowchart 400, or may include more, or fewer steps.

Beginning with step 410 of flowchart 400 and referring to FIGS. 1 and 3A, step 410 comprises receiving a rich media access code sent from a mobile device. Step 410 may correspond, for example, to receipt at communications server 110, in FIG. 1, of a message like that shown in visual frame 300a, from mobile device 130a. For illustrative purposes, let us focus on the exemplary scenario of a group visit to a theme park, such as Disney's California Adventure Park, in Anaheim, Calif. For this example, let us further assume that mobile devices 130a, 130b, and 130c are operated by three members of the group.

Upon entry into Disney's California Adventure Park, the group may be provided with documentation explaining the features and operation of the available services for managing distribution of rich media content within the park. The documentation may include a rich media access code that may be used in common by the users of mobile devices 130a, 130b, and 130c. The rich media access code may take the form of a printed alphanumeric code, requiring manual entry into the respective mobile devices, or a radio frequency identification (RFID) tag readable by mobile device 130*a*, 130*b*, and 130, for example. In one embodiment, a protocol for assigning rich media access codes assures that sequential codes are not assigned to successive users, or groups of users, entering the park, in order to prevent one visitor or group from successfully anticipating the rich media access code assigned to another visitor or group, and sending or receiving rich media content corresponding to that other group's access code.

Having received and reviewed the documentation explaining available in-park services for managing distribution of rich media content, the group members wishing to opt in to the service provided by rich media control application 116, may do so by sending a specific text message to communications server 110. In one embodiment, shown in FIG. 3A, the opt-in text message is sent to a number corresponding to rich media control application 116, i.e. 72389 in FIG. 3A. The contents of the text message include rich media access code 342 and the name by which the user of mobile device 330 wishes to be recognized by communications server 110. Receipt of such an opt-in message from any one of mobile devices 130*a*, 130*b*, or 130*c*, at communications server 110, occurs at step 410 of flowchart 400. Although the embodiment represented by FIG. 3A depicts the opt-in message as a text message, that depiction is merely exemplary. In other embodiments, for example, opting in may be performed by activating a rich media access code by means of barcode scanning, fingerprint or other biometric scanning, or through use of a smart-card device, for example.

The method of flowchart 400 continues with step 420, which comprises authenticating activation of the rich media access code. Step 420 may be performed on communications server 110, for example, using rich media control application 116 and referring to a database of active group sessions (not shown in FIG. 1) available on communications server 110. Authenticating activation of a rich media access code in step 420 may comprise confirming that an earlier provided rich media access code, sent previously by another of mobile devices 130*a*, 130*b*, or 130*c*, for example, is a valid code and that activation has occurred.

In some embodiments, a rich media access code is associated with a predetermined activation period. In those embodiments, step 420 may additionally correspond to verification that the activation period has not elapsed. Although not represented in FIG. 4, in some embodiments the method of flowchart 400 may include providing a confirmation message to the mobile device from which the rich media access code was received in step 410. In that embodiment, as shown by FIG. 3B, a confirmation message may comprise a simple welcome greeting and invitation to share photos or videos.

Flowchart 400 continues with step 430, comprising associating the rich media access code with the mobile device from which it was received. In embodiments in which rich media content generated as a result of group activities is produced independently of group rich media control application 116, for example by guest photo management application 122 functioning within local services network 120, rich media control application 116 may serve as an interface application between mobile devices 130*a*, 130*b*, and 130*c*, and rich media content accessible through local services network 120. As a specific example, the user of mobile device 130*a*, 130*b*, or 130*c* may be the subject of photo 152, taken by a theme park photographer using camera 150. The theme park photographer can tag photo 152 with the rich media access code provided by the photo subject group member, and provide the tagged photo for processing by guest photo management application 122.

At various times during a group visit, one or more items of rich media content may be generated in this way and be available for enjoyment through guest photo management application 122. However, because mobile devices 130*a*, 130*b*, and 130*c* are not in direct communication with guest photo management application 122, the members of the group may be unable to view the rich media content as it becomes available. However, rich media control application 116 may be configured to mediate between mobile devices 130*a*, 130*b*, and 130*c* and local services network 120 to advantageously make the content produced through local services network 120 more dynamically accessible to all members of the group. It is noted that although in the present embodiment, the rich media content is shown to comprise a photograph, in other embodiments, rich media content may comprise video content, audio content, and audio/video mashups, for example, in addition to photos.

Step 440 of flowchart 400 comprises requesting rich media content corresponding to the rich media access code from local services network 120. As described in the discussion surrounding step 430, rich media content may be generated independently of group management application 116. However, group management application 116 may be configured to work in with local services network 120 to manage distribution of rich media content. Thus, a correspondence between a rich media access code utilized by guest photo management application 122 to tag items of rich media content produced there, and the rich media access code associated with mobile devices 130*a*, 130*b*, and 130*c*, may exist. Step 440 of the present method proceeds by requesting available rich media content corresponding to the rich media access code from local services network 120.

It is noted that more than one rich media access code may be associated with a mobile device, permitting the users of mobile devices 130*a*, 130*b*, and 130*c*, for example, to generate rich media content tagged with rich media access codes individual to those users, but have all of that rich media content identified with the entire group, as well as other groups. In one embodiment, a group member may initiate a step 440 request by sending a command message to communications server 110. Because rich media content may become available at any time during a group session, however, in one embodiment, requesting rich media content in step 440 is an automated step that may occur periodically, at predetermined time intervals, for example.

Continuing with step 450 of flowchart 400, step 450 comprises receiving rich media content corresponding to the rich media access code from local services network 120. Step 450 corresponds to receipt at communications server 110 of photo 152 after processing by guest photo management application 122, for example. In step 460, the present method continues by sending a notification message to the one or more mobile devices assigned to the rich media access code, enabling access to the rich media content. In the embodiment of FIG. 1, step 460 corresponds to rich media control application 116 issuing a notification message via packet network 124, aggregator 126, and mobile communications carrier 128, to one or more of mobile devices 130*a*, 130*b*, and 130*c*.

In one embodiment, the notification message issued by rich media control application 116 may provide substantially identical notification messages to mobile devices 130*a*, 130*b*, and 130*c*. In another embodiment, however, rich media control application 116 may be configured to determine a suitable notification message format on the basis of information obtained from mobile devices 130*a*, 130*b*, and 130*c*. For example, although in the embodiment of FIG. 1, mobile devices 130*a*, 130*b*, and 130*c* are shown to share mobile communications carrier 128 in common, in other embodiments, each group member may have service through a different carrier. The differences among mobile communications carriers may extend, for instance, to the format of rich media content supported by their respective services. Variations in supported formats may occur as well between users of the same mobile communications carrier having differing service plans.

For example, due to differences in the message formats supported by different carriers, mobile device 130a may be able to receive a wireless application protocol (WAP) Push SMS message, but mobile devices 130b and 130c may not. In that embodiment, a suitable notification message sent to mobile device 130a in step 460 may include a Universal Resource Identifier (URI), or Universal Resource Locator (URL) link, enabling the user of mobile device 130a to identify and/or access rich media content through mobile communications carrier 128 and packet network 124. However, mobile devices 130b and 130c may be sent notification messages comprising an MMS message with a suitably adapted rich media content attachment, or an email with an attachment or embedded link, for example. Where these types of formatting distinctions are made on the basis of mobile communications carrier identity, that carrier identification may be obtained in an automated way by parsing an earlier received message containing the rich media access code, for example.

An advantage of the described approach to flexibly formatting the notification message to a data format accessible by its recipient mobile device is that, for example, where WAP Push is supported, the mobile device user is provided an option of linking to a URI, or URL address and, thus, accessing the available content, or electing not to do so. As a result, that user does not incur costs associated with receiving content when that particular content is unwanted. Moreover, where the rich media content is accessed through communications server 110, providing a user with an option to receive an item of rich media content avoid unnecessary data traffic through communication system 100 when the content is not desired.

In some embodiments, the method of flowchart 400 may further include steps corresponding to distribution of user generated rich media content among group members. For example, the method may further comprise receiving an item of rich media content from the mobile device from which the rich media access code was received in step 410, and sending a group notification message to a second mobile device associated with the rich media access code, wherein the group notification message enables the user of the second mobile device to access the item of rich media content received from the first mobile device.

In addition, in some embodiments, the method of flowchart 400 may include one or more steps for expiring activation of the rich media access code. In one embodiment, for example, it may be desirable to limit services managing distribution of rich media content to theme park visitors during their stay in-park. Consequently, rich media content distribution management services activated as a result of park entrance may be limited in time to an activation period of from twelve to twenty four hours, for example, at the end of which those services are discontinued. In some embodiments the user may be provided a means for terminating activation of the rich media access code voluntarily, prior to the system imposed expiration of the activation period.

Figure 5:
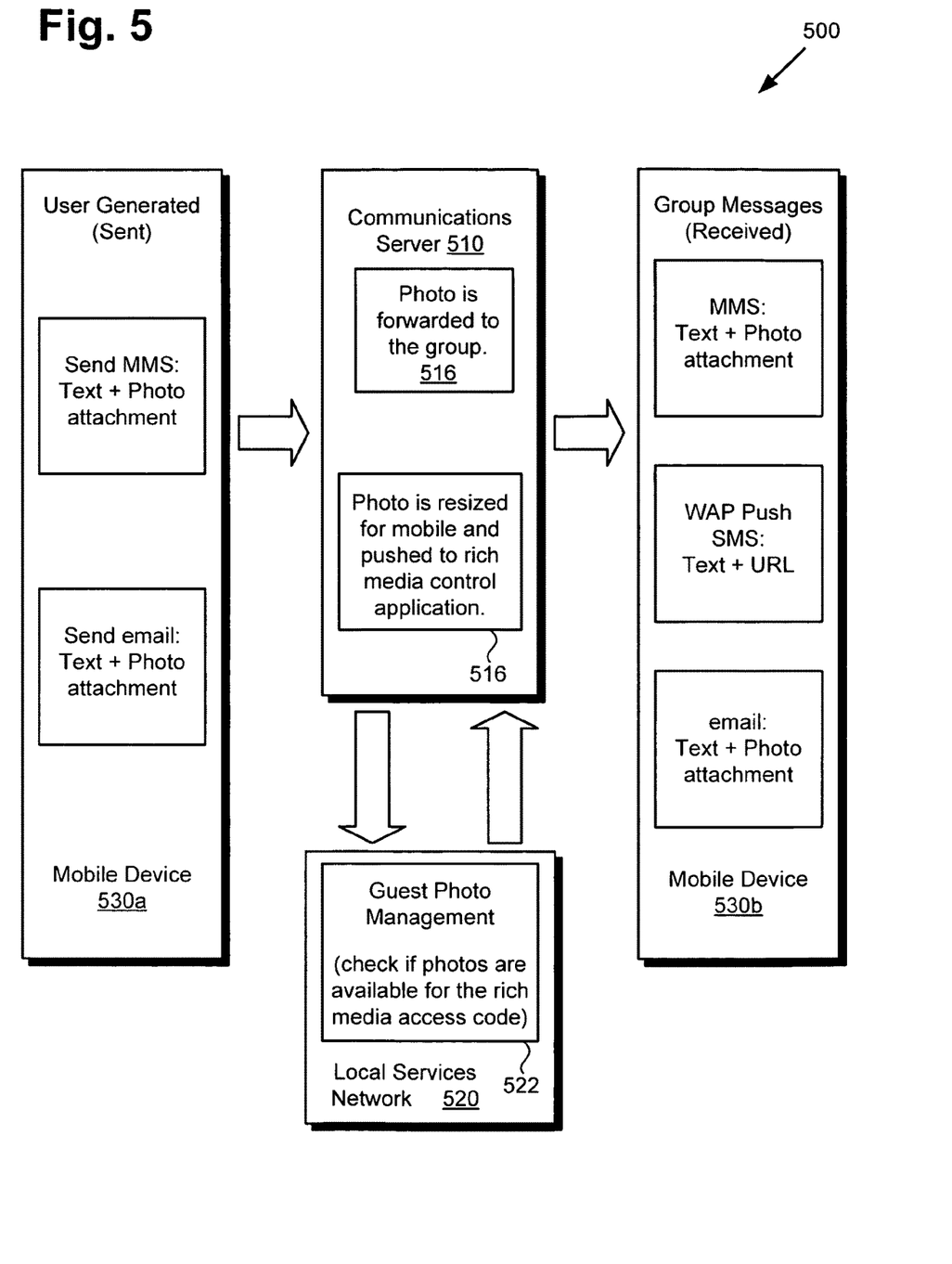
FIG. 5 is a flow diagram showing management of rich media content distribution among the members of a group, according to one embodiment of the present invention.

Turning to FIG. 5, FIG. 5 presents flow diagram 500 corresponding to an exemplary approach to managing distribution of rich media content. Flow diagram 500 shows blocks representing mobile device 530a, communications server 510 including rich media control application 516, local services network 520 including guest photo management application 522, and mobile device 530b, corresponding respectively to mobile device 130a, communications server 110 including rich media control application 116, local services network 120 including guest photo management application 122, and mobile device 130b, in FIG. 1.

According to the embodiment of FIG. 5, mobile device 530b is receiving group rich media content produced by guest photo management application 522, and user generated rich media content provided by mobile device 530a. Distribution of the rich media content from both sources being managed by rich media control application 516 on communications server 510. As described, one source of rich media content available to mobile device 530b is user generated content coming from mobile device 530a. Depending upon its configuration, mobile device 530a, which may be a mobile telephone with a camera, for example, may send a message comprising both text and rich media content as an MMS message or email message to communications server 510, as shown in FIG. 5.

As also described, another source of rich media content available to mobile device 530b is rich media content generated in-park through local services network 520, for example by guest photo management application 522. Communications server 510 is shown to interact with guest photo management application 522 on local services network 520, through rich media control application 516, which also mediates retrieval of in-park generated rich media content.

Communications server 510 can determine the rich media format supported by a mobile communications carrier serving mobile device 530b by parsing an earlier received message from mobile device 530b providing rich media access code information, for example. On the basis of that determination, communications server 510 may provide the rich media content received from mobile device 530a and/or local services network 520, as either an MMS containing a suitably adapted item of rich media, as a WAP Push SMS message containing a URL link, or as an email with a rich media attachment or embedded link. As a result, the present system and method allows the members of a group to share rich media content that is user generated, i.e., provided by any group member, or generated through in-park services as a result of the activities of any group member.

From the above description it is manifest that various techniques can be used for implementing the present concepts without departing from their scope. Moreover, while the present application has provided a disclosure with specific reference to certain embodiments, a person of ordinary skills in the art would recognize that changes can be made in form and detail without departing from the spirit and the scope of the inventive concepts described. As such, the present embodiments are to be considered in all respects as illustrative and not restrictive. It should also be understood that other embodiments are not limited to the particular implementational details described herein, but are capable of many rearrangements, modifications, and substitutions without departing from the disclosed inventive concepts.

What is claimed is:

1. A system for managing distribution of rich media contents between a group of mobile devices of users in a recreational venue, each of the users being persons visiting the recreational venue as guests, the system comprising:
   a communications server accessible by a mobile device;
   a local services network interactively connected to the communications server;

a rich media control application resident on the communications server, the rich media control application configured to:
- receive a rich media access code sent by a first user of using a first mobile device for opting in the group, wherein the first user is a first person visiting the recreational venue;
- opt the first mobile device in the group using the rich media access code;
- receive the rich media access code sent by a second user of using a second mobile device for opting in the group, wherein the second user is a second person visiting the recreational venue;
- opt the second mobile device in the group using the rich media access code;
- receive a rich media content from the first mobile device of the first user, wherein the rich media content is created by the first user or at a request of the first user while visiting the recreational venue; and
- send a notification message in response to receiving the rich media content to each of the mobile devices opted in the group of mobile devices using the rich media access code including the second mobile device.

2. The system of claim 1, wherein the rich media content comprises a photograph.

3. The system of claim 1, wherein the rich media content comprises a video.

4. The system of claim 1, wherein the rich media control application is further configured to expire activation of the rich media access code after a predetermined activation period.

5. The system of claim 1, wherein the rich media content includes an image of the first user.

6. The system of claim 1, wherein the system is configured to support communication via one of email, short message service (SMS) text messaging and Multimedia Messaging Service (MMS) messaging.

7. The system of claim 1, further comprising a rich media communication control software capable of being downloaded to the first mobile device; the rich media communication control software configured to support rich media distribution among the communications server, the local services network, and the first mobile device over a local area network (LAN).

8. The system of claim 1, wherein the system is implemented to manage distribution of rich media content across the recreational venue corresponding to the local services network.

9. The system of claim 8, wherein the recreational venue is one of a theme park and a destination resort.

10. A method for managing distribution of rich media contents between a group of mobile devices of users in a recreational venue, each of the users being individual persons visiting the recreational venue as guests, the method comprising:
- receiving a rich media access code sent by a first user of using a first mobile device for opting in the group, wherein the first user is a first person visiting the recreational venue;
- opting the first mobile device in the group using the rich media access code;
- receiving the rich media access code sent by a second user of using a second mobile device for opting in the group, wherein the second user is a second person visiting the recreational venue;
- opting the second mobile device in the group using the rich media access code;
- receiving a rich media content from the first mobile device of the first user, wherein the rich media content is created by the first user or at a request of the first user while visiting the recreational venue; and
- sending a notification message in response to receiving the rich media content to each of the mobile devices opted in the group of mobile devices using the rich media access code including the second mobile device.

11. The method of claim 10, wherein the rich media content comprises a photograph.

12. The method of claim 10, wherein the rich media content comprises a video.

13. The method of claim 10, further comprising expiring activation of the rich media access code after a predetermined activation period.

14. The method of claim 10, wherein the rich media content includes an image of the first user.

15. The method of claim 10, wherein communications received from the first mobile device comprise one of an email message, a short message service (SMS) text message and Multimedia Messaging Service (MMS) message.

16. The method of claim 10, further comprising providing a rich media communication control software capable of being downloaded to the first mobile device; the rich media communication control software configured to support rich media distribution among the communications server, the local services network, and the first mobile device over a local area network (LAN).

17. The method of claim 16, wherein the LAN is one of a Wi-Fi network and a Worldwide Interoperability for Microwave Access (WiMAX) network.

18. The method of claim 10, wherein the recreational venue is one of a theme park and a destination resort.

* * * * *

UNITED STATES PATENT AND TRADEMARK OFFICE
CERTIFICATE OF CORRECTION

PATENT NO. : 8,745,165 B2
APPLICATION NO. : 12/313229
DATED : June 3, 2014
INVENTOR(S) : Watson et al.

Page 1 of 1

It is certified that error appears in the above-identified patent and that said Letters Patent is hereby corrected as shown below:

In the claims,

Column 11, line 11, "of using" should be changed to --using--.

Signed and Sealed this
Eleventh Day of November, 2014

Michelle K. Lee
*Deputy Director of the United States Patent and Trademark Office*